UNITED STATES PATENT OFFICE.

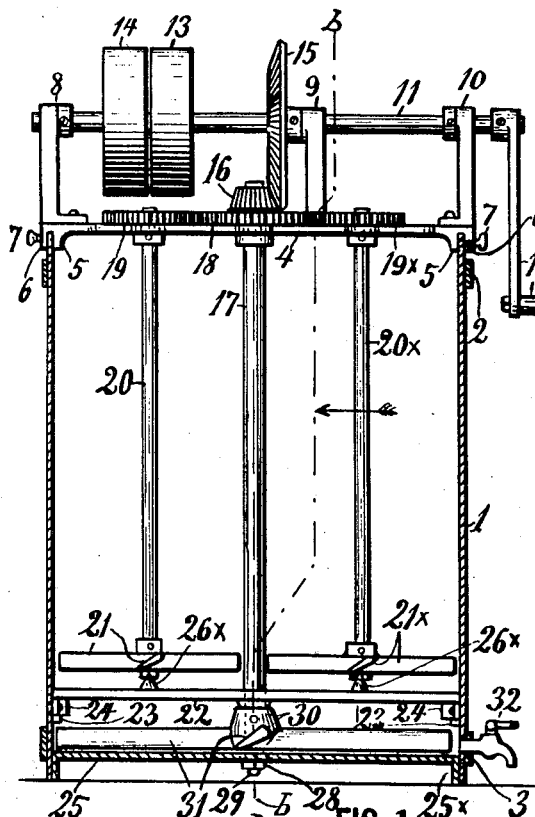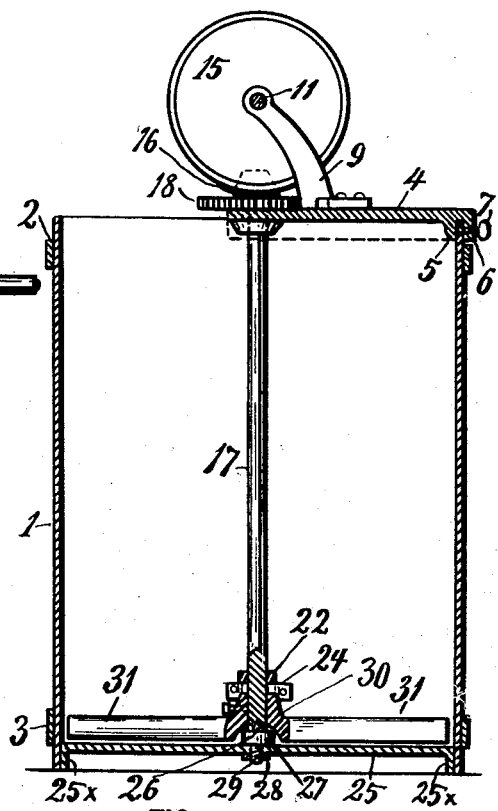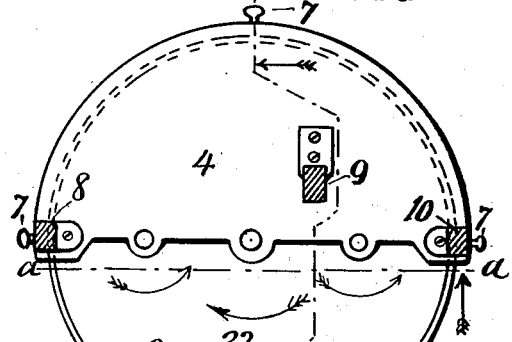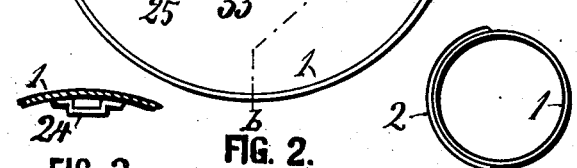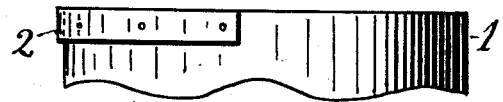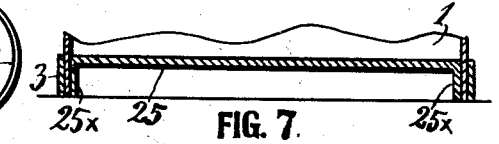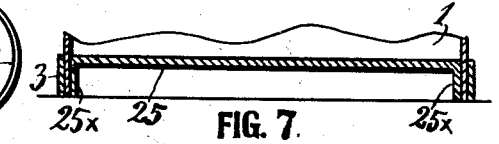

GUSTAV VOSS, OF MADISON, WISCONSIN.

PAINT-MIXER.

1,138,815. Specification of Letters Patent. Patented May 11, 1915.

Application filed September 22, 1913. Serial No. 791,029.

*To all whom it may concern:*

Be it known that I, GUSTAV VOSS, a citizen of the United States, residing at Madison, in the county of Dane and State of Wisconsin, have invented a new and useful Paint-Mixer, of which the following is a specification.

My invention relates to paint mixing machines, and the objects are, to provide a paint mixer which by a special arrangement of propeller-shaped dashers will thoroughly agitate, stir and mix the various ingredients of the paint, and to make such mixing device operable by either hand power or other motive power where the latter is obtainable.

In the accompanying drawing, Figure 1 is a side elevation of my improved paint mixer with the vessel of same in section about as on the line $a$—$a$ Fig. 2. Fig. 2 is a top view of the vessel and its cover with all mechanism removed and the shaft bearings upon the cover intersected a short distance above the cover. Fig. 3 is a fragmentary top view of a portion of the side of the vessel and a socket thereon for holding a certain frame bar. Fig. 4 is a vertical section on the lines $b$—$b$ Figs. 1 and 2. Fig. 5 shows a modification of the upper portion of the vessel in Fig. 4. Fig. 6 shows another modification of the top portion of the vessel. Fig. 7 shows a modification of the lower portion of the vessel. Fig. 8 is a top view of the vessel shown in Fig. 6 but on a greatly reduced scale.

Referring to the drawing by reference numerals, 1 designates the vessel in which the paint is to be mixed, it is cylindrical and preferably made of galvanized sheet metal and is reinforced by two strong metal hoops 2 and 3, one of which may be close to the top as in Fig. 5 and the other close to the bottom end as in Fig. 7; or they may be a short distance from the top and bottom of the vessel, as in Figs. 1 and 4. The upper hoop or ring 2 may also extend only about half way around the vessel, as in Figs. 6 and 8, since the rest of the top of the vessel is stiffened by a strong metallic cover 4, which may preferably be cast; it covers fully half of the top of the vessel and is provided with downward lugs 5 going inside the vessel and lugs 6 going close outside the vessel, the latter lugs are provided with thumb screws 7 which may either clamp the edge of the vessel against the inner lugs or may pass through the wall of the vessel and against or even into the inner lugs, so as to hold the cover firmly on the vessel.

Mounted in bearings 8, 9 and 10 upon the cover is a horizontal shaft 11 having a hand crank 12, a tight pulley 13 and a loose pulley 14. On the shaft is fixed a bevel gear 15 meshing with a bevel pinion 16, which is fixed on a central dasher shaft 17, on which is also fixed a cog-wheel 18. Meshing with said cog-wheel 18 are two smaller cog-wheels 19, 19$^x$, fixed on two dasher shafts 20 and 20$^x$, which are provided with propeller-shaped dashers 21, 21$^x$ and have their lower ends journaled upon a horizontal bar 22, whose downward ends 23 are slipped into sockets 24 fixed at diametrically opposite points of the inner side of the vessel. Said bar 22 is provided with a central hole through which the shaft 17 passes and is journaled to the bottom 25 of the vessel. Such journaling preferably involves a conic stud 26 engaging a cavity in the end of the shaft and having a shoulder 27 drawn tightly down upon the bottom by a nut 28 on a stem 29 extending through the center of the bottom. The shafts 20 and 20$^x$ may be journaled on similar conic studs 26$^x$. On the lower end of the shaft 17, near the bottom of the vessel is secured the main dasher 30, which is also of the propeller type, having twisted or laterally inclined radial blades 31, the same shape as can be seen in the middle of the smaller dashers 21, 21$^x$.

The edge 25$^x$ of the bottom 25 is preferably turned downward and secured to the body of the vessel so as to reinforce the portion of the vessel extending below the bottom and serving to support the whole device.

32 is a faucet from which to draw mixed paint.

In the operation of the mixer, the oil, whitelead or other ingredients to be mixed into paint ready for use, are placed in the vessel 1 and if the machine is of a small or medium size, it is turned by the crank 12, the tight pulley 13 serving as a fly-wheel; and if power is available a driven belt may be put onto the pulleys and the crank 12 removed. When thus in operation the main dasher 25 will stir and throw the lead and other ingredients upward in a circular wave and the smaller dashers will throw that wave downward while also carrying the paint from the walls of the vessel toward the center thereof and the paint near the center toward the walls, whereby, as the paint sinks down again into the vacuum the large dasher tends to make near the bottom of the vessel, the paint which at first received but little agitation from the inner ends of the blades of the large dasher will be moved to the outer ends and other parts of said blades and thus be evenly agitated and thoroughly mixed. In said mixing process by the three dashers the intermediate frame bar 22 renders good service by resisting a too free and regular rotation and circulation of the paint in the vessel, it being readily understood that an obstruction in any fluid current aids in stirring and agitating the fluid. For large machines, used at paint factories for making ready mixed paint, the crank 12 is omitted.

The opening 33 in Fig. 2 gives access to the inside of the machine for filling it and for inspecting the condition of its contents. If the machine is to be emptied and cleaned, the screws 7 are loosened and the cover 19 lifted off, whereby the dasher shafts and dashers and the cross bar 22 are also removed from the vessel, and the latter may be fully emptied and cleaned. It is to facilitate such cleaning that the lower shaft journals are made with conic supports, 26 and 26$^x$, so they have no cavity for paint to lodge in; the only cavities involved are in the ends of the shafts and are thus inverted so no paint can lodge in them.

The machine may also be used as a churn for churning cream into butter.

What I claim is:—

1. In a machine of the kind described, the combination with a cylindrical vessel having a bottom and a detachably secured cover partly closing its top, of a dasher shaft journaled in the cover and the bottom in central position of the vessel, a propeller-shaped dasher fixed on said shaft and having its blades moving near the bottom and the sides of the vessel, a horizontal bar having its ends detachably secured to the inner side of the lower portion of the vessel, other dasher shafts arranged parallel to the central shaft and having their lower ends journaled on the horizontal bar and their upper ends journaled in the cover, propeller-shaped dashers fixed on said other dasher shafts, meshing cog-wheels fixed on the upper ends of all the dasher shafts, and means for rotating one of the dasher shafts and thereby all of them.

2. In a machine of the kind described, the combination with a cylindrical vessel having a bottom and a detachably secured cover partly closing its top, of a dasher shaft journaled in the cover and the bottom in central position in the vessel, a propeller-shaped dasher fixed on said shaft and having its blades moving near the bottom and the sides of the vessel, a horizontal bar having its ends detachably secured to the inner side of the lower part of the vessel, other dasher shafts arranged parallel to the central shaft and having their lower ends journaled on the horizontal bar and their upper ends journaled in the cover, propeller-shaped dashers fixed on said other dasher shafts, meshing cog-wheels fixed on the upper ends of all the dasher shafts and means for rotating one of the dasher shafts and thereby all of them, said means for rotation consisting of a bevel pinion fixed on the central dasher shaft, bearings fixed upon the cover, a horizontal shaft journaled in the bearing, a bevel gear fixed on the horizontal shaft and meshing with the first mentioned bevel gear, and means for turning the horizontal shaft.

In testimony whereof I affix my signature, in presence of two witnesses.

GUSTAV VOSS.

Witnesses:
 FRED HANDEL,
 FRANK SCHMELZER.